United States Patent
Patel et al.

(10) Patent No.: US 7,368,490 B2
(45) Date of Patent: May 6, 2008

(54) RUBBER COMPOSITIONS COMPRISING UNSATURATED IMIDOALKOXYSILANES

(75) Inventors: Ben Patel, Niskayuna, NY (US);
Brennan Smith, Schenectady, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 153 days.

(21) Appl. No.: 11/287,757

(22) Filed: Nov. 28, 2005

(65) Prior Publication Data

US 2007/0123616 A1    May 31, 2007

(51) Int. Cl.
*C08G 73/10* (2006.01)
(52) U.S. Cl. .................................................. 524/104
(58) Field of Classification Search .................. 524/104
See application file for complete search history.

(56) References Cited

U.S. PATENT DOCUMENTS

2003/0221760 A1  12/2003  Grimberg et al.
2004/0023926 A1   2/2004  Guennouni et al.

FOREIGN PATENT DOCUMENTS

EP    1439182    7/2004

*Primary Examiner*—Peter D. Mulcahy
(74) *Attorney, Agent, or Firm*—Dominick G. Vicari

(57) ABSTRACT

A rubber comprising a silane, a filler and at least one rubber selected from the group consisting of solution polymerization-derived styrene-butadiene rubber (S-SBR) having from about 10 to about 80 percent vinyl content; (ii) emulsion polymerization-derived rubber; and (iii) butadiene rubber having from about 5 to about 99 percent cis content and from about 0 to about 60 percent vinyl content.

18 Claims, No Drawings

RUBBER COMPOSITIONS COMPRISING UNSATURATED IMIDOALKOXYSILANES

FIELD OF THE INVENTION

The present invention relates to rubber compositions comprising α,β-unsaturated cyclic imidoalkoxysilanes.

BACKGROUND OF THE INVENTION

There are different processes for making α,β-unsaturated cyclic imidoalkoxysilanes that are known in the art. These processes are based on the condensation of anhydride precursors with primary aminoalkoxysilanes, and produce water as one of the reaction by-products. Typically, the water produced is scavenged from the reaction using one or more chemical desiccants, for example hexamethyldisilazane (HMDZ) or trimethylsilyl chloride (TMSCI). These chemical desiccants must be used in at least stoichiometeric amounts, which makes these processes economically unfeasible when used to produce α,β-unsaturated cyclic imidoalkoxysilanes on a large commercial scale.

An object of the invention is directed to specific rubber compositions comprising at least one α,β-unsaturated cyclic imidoalkoxysilanes of the present invention. This and other objects are further described below.

SUMMARY OF THE INVENTION

The present invention is directed to rubber compositions comprising at least one α,β-unsaturated cyclic imidoalkoxysilane compound having the general formula:

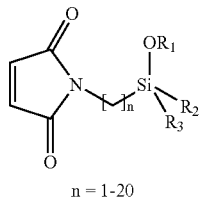

n = 1-20 wherein $R^1$ is an alkylene or cycloalkylene group of from 1 to about 20 carbon atoms or an arylene group of from 6 to about 20 carbon atoms, $R^2$ and $R^3$ each is independently is an alkoxy, an alkyl or cycloalkyl group of from 1 to about 20 carbon atoms or an aryl group of from 6 to about 20 carbon atoms, and n is an integer from about 1 to about 20. The rubber composition also contains at least one filler and at least one rubber selected from the group consisting of (i) solution polymerization-derived styrene-butadiene rubber (S-SBR) having from about 10 to about 80 percent vinyl content; (ii) emulsion polymerization-derived rubber; and (iii) butadiene rubber having from about 5 to about 99 percent cis content and from about 0 to about 50 percent vinyl content.

Another embodiment of the invention is directed to a rubber composition containing a filler wherein the filler is pretreated with the at least one of the α,β-unsaturated cyclic imidoalkoxysilanes of the present invention before being added to the rubber composition.

DETAILED DESCRIPTION OF THE INVENTION

The present invention is directed to the rubber compositions comprising at least one α,β-unsaturated cyclic imidoalkoxysilane compound having the general formula:

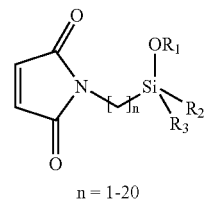

n = 1-20 wherein $R^1$ is an alkylene or cycloalkylene group of from 1 to about 20 carbon atoms or an arylene group of from 6 to about 20 carbon atoms, $R^2$ and $R^3$ each independently is an alkoxy, an alkyl or cycloalkyl group of from 1 to about 20 carbon atoms or an aryl group of from 6 to about 20 carbon atoms, and n is an integer from about 1 to about 20.

The rubber composition of the present invention also contains at least one filler and at least one rubber selected from the group consisting of (i) solution polymerization-derived styrene-butadiene rubber (S-SBR) having from about 10 to about 80 percent vinyl content; (ii) emulsion polymerization-derived rubber; and (iii) butadiene rubber having from about 5 to about 99 percent cis content and from about 0 to about 50 percent vinyl content.

Although the α,β-unsaturated cyclic imidoalkoxysilanes used in the present invention can be produced in different manners, one economical way to produce the silane is by using a Diels-Alder reaction mechanism. This mechanism produces α,β-unsaturated cyclic imidoalkoxysilane compounds used in the rubber compositions of the present invention without the use of costly chemical desiccants. In particular, the α,β-unsaturated cyclic imidoalkoxysilane compounds of the present invention maybe prepared from a cyclic anhydride precursor using an imidation step, a Diels Alder protection step, a transimidation step, and a deprotection step. One mechanism that can be used to produce α,β-unsaturated cyclic imidoalkoxysilane compounds that are used in the rubber compositions of the present invention is described in the reaction mechanism shown below.

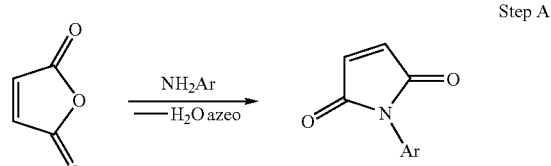

Step A

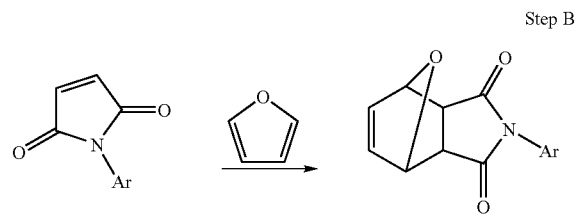

Step B

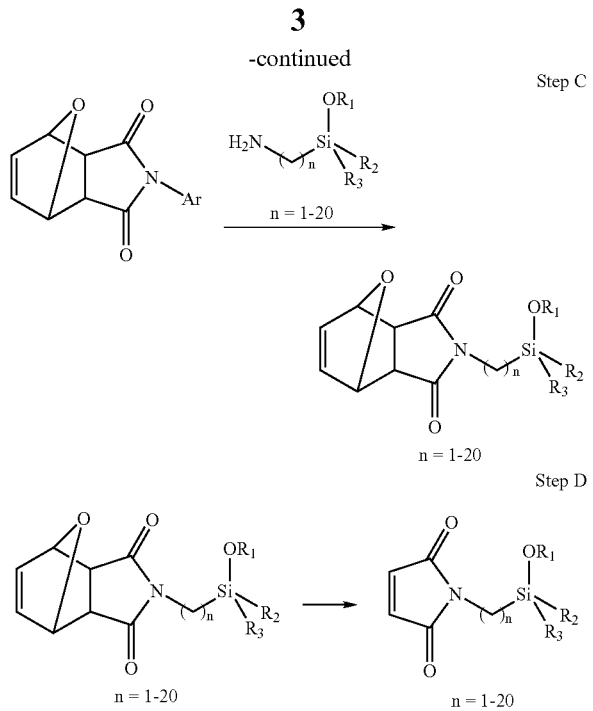

Step C

Step D

The imidation step is carried out in an organic solvent which forms an azeotrope with water, which allows the removal of water from the product mixture via azeotropic distillation. This step eliminates the need for any type of chemical desiccant. A Diels-Alder reaction (also called the 4+2 cycloaddition reaction) is a well-known technique for the synthesis of six member rings. This reaction involves the 1,4-addition of the double bond of a dienophile to a conjugated diene to generate a six-member ring. In the present invention, the use of a Diels-Alder protection strategy is employed to protect the unsaturation in the aromatic imide product, from nucleophilic reduction, in order to assure that this α,β-unsaturated double bond remains in tact in the final product. The resulting Diels-Alder protected unsaturated N-substituted aromatic cyclic imide can then be reacted with a nucleophile, such as an aminoalkoxysilane, e.g. aminopropyltriethoxysilane, to produce the protected derivative of the desired product, which can then be thermally deprotected The diene can include cyclic, heterocyclic and highly substituted materials providing the diene is "psuedo aromatic." These "psuedo aromatic" dienes are further discussed below.

This process which comprises transimidating a substantially water-free Diels-Alder protected unsaturated aromatic N-substituted cyclic imide with at least one aminoalkoxysilane provides at least one Diels-Alder protected unsaturated cyclic imidoalkoxysilane intermediate having the general formula:

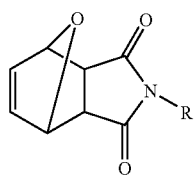

wherein R is a primary aromatic amine, a primary arylamine or a primary heteroarylamine can be obtained by the process which comprises imidating an α,β-unsaturated carboxylic acid anhydride with at least one primary aromatic amine to provide at least one unsaturated aromatic N-substituted cyclic imide. The conjugated double bond of the unsaturated aromatic N-substituted imide is then reacted with a psuedo aromatic diene under Diels-Alder reaction conditions so as to protect the double bond from reacting. For example, protecting the conjugated double bond of the unsaturated aromatic N-substituted cyclic imide eliminates the possibility of any Michael or "ene-type" reactions at the double bond by a nucleophile, therefore preserving the double bond in the product upon the completion of the deblocking step.

Another way to produce the Diels-Alder protected α,β-unsaturated aromatic N-substituted cyclic imide is obtained by the process which comprises protecting the double bond of an α,β-unsaturated cyclic anhydride with a "psuedo aromatic" diene under Diels-Alder reaction conditions to provide Diels-Alder protected unsaturated cyclic anhydride. The Diels-Alder protected unsaturated cyclic anhydride is then imidated with at least one primary aromatic amine to produce at least one Diels-Alder adduct, namely the Diels-Alder protected unsaturated aromatic N-substituted cyclic imide.

Water is produced as part of the transimidating step of the reaction mechanism which can lead to premature hydrolysis of the alkoxysilanes if not removed. Chemical desiccants have conventionally been used in order to remove the water from the reaction mix so as to prevent the water from reacting with other reactants in the mixture to produce unwanted side-products. As stated above, these desiccants are very costly and therefore make the reaction economically challenging when produce on a large commercial scale. The process above described process avoids using these costly desiccants by conducting the reaction in solvents that allow the water to be removed using azeotropic distillation. In other words, the N-substituted aromatic cyclic imide of the imidating step is separated from water by azeotropic distillation prior to completing the reaction mechanism.

Possible azeotropic solvents that can be used in the reaction include but are not limited to toluene, xylenes, orthodichlorobenzene, or any other relatively high boiling organic solvent that the starting materials of the reaction, namely the unsaturated cyclic anhydride and the primary aromatic amine, are soluble and forms an azeotrope with water. Forming the azeotrope with water allows the water to be removed from the reaction vessel by azeotropic distillation.

As stated above the diene used in the Diels-Alder reaction must be "pseudo-aromatic", that is the diene must possess aromatic characteristics without actually being aromatic. The term "pseudo aromatic" refers to a conjugated system which is not strictly aromatic, but which is stabilized by means of delocalization of pi-electrons and behaves in a similar manner to aromatic rings. Examples of pseudoaromatic rings include but are not limited to furan, thiophene, pyrole, anthracenes, fulvenes, and the like. In the context of the present invention, the term "pseudo-aromatic" diene is meant to include those cyclic dienes in which the atoms of the cycle, both carbon and heteroatoms, possess sp2-hybridization character so as to allow at least partial delocalization of the conjugated electrons throughout the ring. The significance of using a "psuedo aromatic" diene instead of a typical diene for the blocking step of the Diels-Alder reaction is that the pseudo-aromatic diene can typically undergo reverse Diels-Alder reactions at significantly lower temperatures than typical dienes. In the context of the present invention a relatively low temperature for the removal of the diene moiety is below about 200 degree Celsius. In other words, using an aromatic diene in the Diels-Alder reaction as the protecting group would require that the deprotecting step be carried out at a temperature of above about 200° C., wherein using a psuedo aromatic diene as the protecting group would allow the deprotecting step to occur at a temperature below about 200° C. The lower temperature not only saves energy, but also reduces the production of potential side-products making purification easier.

Possible "pseudo-aromatic" dienes that can be used in the Diels-Alder reaction as the blocking group include but are not limited to the following: furan, substituted furans, including but not limited to 2,3-bishydroxymethyl furan, 3,4-bishydroxymethyl furan, and 2,5-bishydroxymethyl furan, fulvene, substituted fulvenes including but not limited to 6,6-dimethylfulvene, anthracene and substituted anthracenes. The dienes may be monosubstituted or polysubstituted with various functional groups. The functional groups may be selected from e.g. alkyl chains ($C_2$-$C_{20}$, methyl, ethyl, iso-propyl, tert-butyl, etc.), OH, SH, halogens, aryl, carboxyl, carbonyl, nitro, carboxyamido, keto, sulfoxide, sulfone, sulfonic acid, phosphoric acid or amino groups, which are bound directly or via alkyl residues.

The Diels-Alder protected unsaturated aromatic N-substituted cyclic imide produced as an intermediate can either be stored for later use or can be further reacted with a nucleophile such as an aminopropyltrialkoxysilane molecule in the presence of a suitable Lewis acid to produce a Diels-Alder protected unsaturated cyclic imidoalkoxysilane. Other aminoalkoxysilanes can be used providing they have at least one alkoxy group. Examples of appropriate aminoalkoxyosilanes that can be used in transimidating step C include but are not limited to aminoalkoxysilanes with the chemical formula I:

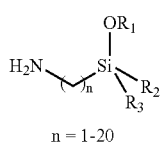

n = 1-20 wherein $R^1$ is an alkylene or cycloalkylene group of from 1 to about 20 carbon atoms or an arylene group of from 6 to about 20 carbon atoms, $R^2$ and $R^3$ each is independently is an alkoxy, an alkyl or cycloalkyl group of from 1 to about 20 carbon atoms or an aryl group of from 6 to about 20 carbon atoms, and n is an integer from about 1 to about 20.

Even more particularly, the aminoalkoxysilane used in the transimidating step can be at least one aminosilane selected from the group consisting of aminomethyl-triethoxy-silane, (3-amino-propyl)triethoxy-silane, (3-amino-propyl)-methyl-diethoxy-silane, (3-amino-propyl)-phenyl-dimethoxy-silane, (4-amino-butyl)triethoxy-silane, (3-amino-2-methyl-propyl)-triethoxy-silane, (4-amino-butyl)-methyl-diethoxy-silane, (3-aminopropoxypropyl)-triethoxy-silane, (3-aminopropoxypropyl)-trimethoxy-silane, (3-aminopropoxypropyl)-methyl-diethoxysilane, (3-aminopropoxypropyl)-ethyl-diethoxy-silane, (p-aminophenyl)-triethoxy-silane, (2-amino-ethylaminomethyl)-(methoxyethoxy)-bis-(1-methylpropylidene aminoxy)-silane and [(.omega.-amino-alkylamino)-alkyl]-trialkoxy-silanes, and, especially, [3-(2-amino-ethylamino)-propyl]-trimethoxysilane, [3-(3-amino-propylamino)-propyl]-triethoxy-silane, [(2-amino-ethylamino)-methyl]-triethoxy-silane and [(6-aminohexylamino)-methyl]-trimethoxy-silane.

As stated above, the transimidating step can be carried out in the presence of a Lewis Acid. An example of a suitable Lewis Acid includes but is not limited to $ZnCl_2$. Other suitable Lewis acids include but are not limited to alkali metal salts and oxides, alkaline earth metal halogen salts and oxides, lanthanide halogen salts and oxides, and any mixtures thereof The above reactions may take place in the presence or absence of suitable chemical catalyst. In addition, each of the steps of the reaction can be controlled by heat and or pressure. In particular, the transimidating step may be carried out at a pressure of from about 0.1 atm to about 20 atm and a temperature of from about 25 deg C. to about 200 deg C. The deprotecting step of the present invention may be carried out at a pressure of from about 0.1 atm to about 20 atm and a temperature of from about 25 deg C. to about 200 deg C.

Once the $\alpha,\beta$-unsaturated cyclic imidoalkoxysilane compounds are produced or otherwise obtained they can be blended with at least one filler and at least one rubber selected from the group consisting of (i) solution polymerization-derived styrene-butadiene rubber (S-SBR) having from about 10 to about 80 percent vinyl content; (ii) emulsion polymerization-derived rubber; and (iii) butadiene rubber having from about 5 to about 99 percent cis content and from about 0 to about 50 percent vinyl content to produce a rubber composition of the present invention.

Suitable organic polymers and fillers for use herein are well known in the art and are described in numerous texts, of which two examples include The Vanderbilt Rubber Handbook; R. F. Ohm, ed.; R. T. Vanderbilt Company, Inc., Norwalk, Conn.; 1990 and Manual For The Rubber Industry; T. Kempermann, S. Koch, J. Sumner, eds.; Bayer A G, Leverkusen, Germany; 1993. Representative examples of suitable polymers include solution styrene-butadiene rubber (SSBR), styrene-butadiene rubber (SBR), natural rubber (NR), polybutadiene rubber (BR), ethylene-propylene co- and ter-polymers (EP, EPDM), and acrylonitrile-butadiene rubber (NBR).

Generally, the rubber composition can be comprised of at least one diene-based elastomer, or rubber. Suitable conjugated dienes include, but are not limited to, isoprene, 1,3-butadiene and the like and mixtures thereof. Suitable vinyl aromatic compounds include, but are not limited to, styrene, alpha methyl styrene and the like and mixtures thereof. Thus, the rubber is a sulfur curable rubber. Such diene based elastomer, or rubber, may be selected, for example, from at least one of cis-1,4-polyisoprene rubber (natural and/or synthetic), and natural rubber), emulsion polymerization prepared styrene/butadiene copolymer rubber, organic solution polymerization prepared styrene/butadiene rubber, e.g., of from about 10 to about 80 weight percent vinyl content in one embodiment, from about 25 to about 48 weight percent vinyl content in a second embodiment and from about 53 to about 75 weight percent vinyl content in a third embodiment, 3,4-polyisoprene rubber, isoprene/butadiene rubber, styrene/isoprene/butadiene terpolymer rubber, polybutadiene rubber of low cis-1,4 content (i.e., from about 5 to about 19 weight percent), medium cis-1,4 content (i.e., from about 20 to about 89 weight percent) or high cis-1,4 content (i.e., at least about 90 weight percent), and a vinyl content of from 0 to about 50 weight percent, styrene/isoprene copolymers, emulsion polymerization prepared styrene/butadiene/acrylonitrile terpolymer rubber and butadiene/acrylonitrile copolymer rubber. An emulsion polymerization derived styrene/butadiene (E-SBR) may be used having a relatively conventional styrene content of from about 20 to about 28 weight percent bound styrene or, for some applications, an E-SBR having a medium to relatively high bound styrene content, namely, a bound styrene content of from about 30 to about 45 weight percent. Emulsion polymerization prepared styrene/butadiene/acrylonitrile terpolymer rubbers comprising from 2 to about 40 weight percent bound acrylonitrile in the terpolymer are also contemplated as diene based rubbers for use in this invention.

The solution polymerization prepared SBR (S-SBR) typically has a bound styrene content of up to about 50 percent in one embodiment and from about 5 to about 36 percent in another embodiment, and vinyl content up to about 60% in one embodiment and from about 40 to about 55% in another embodiment.

Representative examples of suitable filler materials include oxides, such as silica (pyrogenic and precipitated), titanium dioxide, aluminosilicate, and alumina, siliceous materials, including clays and talc, and carbon black. Particulate, precipitated silica is also sometimes used for such purpose, particularly in connection with a silane. In some cases, a combination of silica and carbon black is utilized for reinforcing fillers for various rubber products, including treads for tires. Alumina can be used either alone or in combination with silica. The term "alumina" can be described herein as aluminum oxide, or $Al_2O_3$. The fillers may be hydrated or in anhydrous form The vulcanized rubber composition should comprise a sufficient amount of filler to contribute a reasonably high modulus and high resistance to tear. The combined weight of the filler may be as low as about 5 phr to about 100 phr and all subranges therebetween, but it can be from about 25 phr to about 85 phr and all subranges therebetween in another embodiment.

In one embodiment precipitated silicas are utilized as a filler. The silica may be characterized by having a BET surface area, as measured using nitrogen gas, in the range of about 40 to about 600 $m^2/g$, and more usually in a range of about 50 to about 300 $m^2/g$. The BET method of measuring surface area is described in the *Journal of the American Chemical Society*, Volume 60, page 304 (1930). The silica typically may also be characterized by having a dibutylphthalate (DBP) absorption value in a range of about 100 to about 350, and more usually about 150 to about 300. Further, the silica, as well as the aforesaid alumina and aluminosilicate, may be expected to have a CTAB surface area in a range of about 100 to about 220. The CTAB surface area is the external surface area as evaluated by cetyl trimethylammonium bromide with a pH of about 9. The method is described in ASTM D 3849.

Mercury porosity surface area is the specific surface area determined by mercury porosimetry. For such technique, mercury is penetrated into the pores of the sample after a thermal treatment to remove volatiles. Set up conditions may be suitably described as using about a 100 mg sample, removing volatiles during about 2 hours at about 105° C. and ambient atmospheric pressure to about 2000 bars pressure measuring range. Such evaluation may be performed according to the method described in Winslow, Shapiro in ASTM bulletin, p. 39 (1959) or according to DIN 66133. For such an evaluation, a CARLO-ERBA Porosimeter 2000 might be used. The average mercury porosity specific surface area for the silica should be in a range of about 100 to about 300 $m^2/g$.

In one embodiment a suitable pore size distribution for the silica, alumina and aluminosilicate according to such mercury porosity evaluation is considered herein to be five percent or less of its pores have a diameter of less than about 10 nm; about 60 to about 90 percent of its pores have a diameter of about 10 to about 100 nm; about 10 to about 30 percent of its pores have a diameter at about 100 to about 1,000 nm; and about 5 to about 20 percent of its pores have a diameter of greater than about 1,000 nm.

In another embodiment the silica may be expected to have an average ultimate particle size, for example, in the range of about 0.01 to about 0.05 µm as determined by the electron microscope, although the silica particles may be even smaller, or possibly larger, in size. Various commercially available silicas may be considered for use in this invention such as, from PPG Industries under the HI-SIL trademark with designations HI-SIL 210, 243, etc.; silicas available from Rhone-Poulenc, with, for example, designation of ZEOSIL 1165MP; silicas available from Degussa with, for example, designations VN2 and VN3, etc. and silicas commercially available from Huber having, for example, a designation of HUBERSIL 8745.

Where it is desired for the rubber composition, which comprises both a siliceous filler such as silica, alumina and/or aluminosilicates and also carbon black reinforcing pigments, to be primarily reinforced with silica as the reinforcing pigment, the weight ratio of such siliceous fillers to carbon black can be about at least 3/1 in one embodiment, about at least 10/1 in another embodiment and, thus, in a range of about 3/1 to about 30/1. The filler may be comprised of about 15 to about 95 weight percent precipitated silica, alumina and/or aluminosilicate and, correspondingly about 5 to about 85 weight percent carbon black, wherein the carbon black has a CTAB value in a range of about 80 to about 150. Alternatively, the filler can be comprised of about 60 to about 95 weight percent of the silica and all subranges therebetween, alumina and/or aluminosilicate and, correspondingly, about 40 to about 5 weight percent carbon black and all subranges therebetween. The siliceous filler and carbon black may be pre-blended or blended together in the manufacture of the vulcanized rubber.

The rubber composition may be compounded by methods known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, plasticizers, fillers, pigments, fatty acid, zinc oxide, waxes, antioxidants and antiozonants, peptizing agents, and reinforcing materials such as, for example, carbon black. Depending on the intended use of the sulfur vulcanizable and sulfur vulcanized material or rubber, the additives mentioned above are selected and commonly used in conventional amounts.

The vulcanization may be conducted in the presence of an additional sulfur-vulcanizing agent. Examples of suitable sulfur vulcanizing agents include, for example elemental sulfur (free sulfur) or sulfur donating vulcanizing agents, for example, an amino disulfide, polymeric polysulfide or sulfur olefin adducts which are conventionally added in the final, productive, rubber composition mixing step. The sulfur vulcanizing agents, which are common in the art are used, or added in the productive mixing stage, in an amount ranging from about 0.4 to about 3 phr and all subranges therebetween, or even, in some circumstances, up to about 8 phr, with a range of from about 1.5 to about 2.5 phr and all subranges therebetween in one embodiment and from about 2 to about 2.5 phr and all subranges therebetween in another embodiment.

Vulcanization accelerators, i.e., additional sulfur donors, may be used herein. It is appreciated that may include the following examples, benzothiazole, alkyl thiuram disulfide, guanidine derivatives and thiocarbamates. Representative of such accelerators can be, but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropyl-benzothiozole-2-sulfenamide, zinc-2-mercaptotoluimidazole, dithiobis(N-methyl piperazine), dithiobis(N-beta-hydroxy ethyl piperazine) and dithiobis(dibenzyl amine). Other additional sulfur donors may be, for example, thiuram and morpholine derivatives. Representative of such donors are, for example, but not limited to, dimorpholine disulfide, dimorpholine tetrasulfide, tetramethyl thiuram tetrasulfide, benzothiazyl-2, N-dithiomorpholide, thioplasts, dipentamethylenethiuram hexasulfide, and disulfidecaprolactam.

Accelerators are used to control the time and/or temperature required for vulcanization and to improve the properties of the vulcanizate. In one embodiment, a single accelerator system may be used, i.e., a primary accelerator. Conventionally, a primary accelerator(s) is used in total amounts ranging from about 0.5 to about 4 and all subranges therebetween in one embodiment, and from about 0.8 to about 1.5 phr and all subranges therebetween in another embodiment. Combinations of a primary and a secondary accelerator might be used with the secondary accelerator being used in smaller amounts (of about 0.05 to about 3 phr and all subranges therebetween) in order to activate and to improve the properties of the vulcanizate. Delayed action accelerators may be used. Vulcanization retarders might also be used. Suitable types of accelerators are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator can be a guanidine, dithiocarbamate or thiuram compound.

Typical amounts of tackifier resins, if used, comprise about 0.5 to about 10 phr and all subranges therebetween, usually about 1 to about 5 phr and all subranges therebetween. Typical amounts of processing aids comprise about 1 to about 50 phr and all subranges therebetween. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants, comprise about 1 to about 5 phr and all subranges therebetween. Typical amounts of fatty acids, if used, which can include stearic acid, comprise about 0.5 to about 3 phr and all subranges therebetween. Typical amounts of zinc oxide comprise about 2 to about 5 phr and all subranges therebetween. Typical amounts of waxes comprise about 1 to about 5 phr and all subranges therebetween. Often microcrystalline waxes are used. Typical amounts of peptizers comprise about 0.1 to about 1 ph and all subranges therebetween r. Typical peptizers may be, for example, pentachlorothiophenol and dibenzamidodiphenyl disulfide.

The rubber compositions of this invention can be used for various purposes. For example, it can be used for various tire compounds. Such tires can be built, shaped, molded and cured by various methods, which are known and will be readily apparent to those having skill in such art. One particularly useful application of the rubber compositions herein is for the manufacture of tire treads. An advantage of tires, tire treads, of other articles of manufacture derived from the rubber compositions herein is they suffer from less VOC emissions during their lifetime and use as a result of having been manufactured from a rubber compound which comprises less residual silane ethoxy groups than do rubber compounds of the known and presently practiced art. This is a direct result of having used dialkoxy-functional silane coupling agents in their manufacture, which comprise fewer or essentially no ethoxy groups on silicon, relative to the silane coupling agents of the currently known and practiced art. The lack or reduction of ethoxysilane groups in the coupling agents used results in fewer residual ethoxy groups on silicon after the article of manufacture is produced, from which fewer or no ethanol can be released by hydrolysis of the residual ethoxysilane groups by exposure of the article of manufacture to water during use.

The rubber compositions herein and the articles of manufacture derivable thereof as described herein are novel from those of the known and commonly practiced art in that both comprise hydrocarbon backbone based diols, as defined herein. Typical examples of such species in the rubber compositions and articles of manufacture described herein include diols such as an isomer of propanediol, pentane diol, and such as ethylene glycol, and propylene glycol. Additional species would include stearate monoesters and/or diesters of these diols. These species possess polarities intermediate between those of the rubber polymers and the filler, thereby helping to stabilize the compositions and articles of manufacture from filler reagglomeration and the resulting degradation of the properties and performance parameters thereof.

The invention may be better understood by reference to the following examples in which the parts and percentages are by weight unless otherwise indicated.

EXAMPLE 1

The following rubber formulation was first mixed in a 300 mL Brabender mixer bowl according to standard methods known to those in the art following ASTM method D3182-89, and holding the final non-productive mixture to about 145 degree Celsius for about 3 minutes. Curing ingredients were added to the material on a 2-roll mill, and the final productive mix was cured to T90 at 149 degree Celsius. Strain and temperature sweeps were preformed on a Rheometric's Dynamic Mechanical Analysis (DMA) instrument as follows: 60 degree Celsius, between about 0.01-50% strain, at about 10 Hertz; and a normal force of about 100 g for the strain sweeps; between about −100 and about 80 degree Celsius, at about 2% strain, at about 10 Hertz and a normal force of about 200 g for the temperature sweep.

| Name | Compound | PHR | Gram |
|---|---|---|---|
| SMR-L | Rubber | 100 | 150 |
| 1165MP | Silica | 50 | 75 |
| N110 | Carbon | 3.0 | 4.5 |
| Sundex | Process Oil | 5.0 | 7.5 |
| ZnO | Zinc Oxide | 4.0 | 6 |
| Industrene R | Stearic Acid | 2.0 | 3 |
| Naugard Q | AntiOx | 2.0 | 3 |
| Flexzone 7P | AntiOz | 2.5 | 3.75 |
| Sunproof Wax | Wax | 1.0 | 1.5 |
| Maleimide Silane | Silane | 2.5 | 3.75 |
| Rubbermakers | Sulfur | 1.4 | 2.1 |
| Santocure | TBBS | 1.6 | 2.4 |
| DPG | DPG | 2.0 | 3.0 |

| $G'_{initial}$ (dyn/cm$^2$) {.11% strain} | $\Delta G'$ (dyn/cm$^2$) {.11-10% strain} | $G''_{max}$ (dyn/cm$^2$) | $\tan\delta_{max}$ | $\tan\delta$ −40° C./wear | $\tan\delta$ 0° C./wet traction in PS | G' 0° C. (dyn/cm2) | G' 60° C. (dyn/cm2) | $\tan\delta$ 60° C./good for RR |
|---|---|---|---|---|---|---|---|---|
| 1.66E+07 | 3.56E+06 | 9.63E+05 | 0.06800 | 1.13618 | 0.11911 | 2.18E+07 | 1.40E+07 | 0.05425 |

EXAMPLE 2
COMPARATIVE EXAMPLE

The following rubber formulation was first mixed in a 300 mL Brabender mixer bowl according to standard methods known to those in the art following ASTM method D3182-89, and holding the final non-productive mixture to about 145 degree Celsius for about 3 minutes. Curing ingredients were added to the material on a 2 roll mill, and the final productive mix was cured to T90 at 145 degree Celsius. Strain and temperature sweeps were preformed on a Rheometric's Dynamic Mechanical Analysis (DMA) instrument as follows: 60 degree Celsius, between about 0.01-50% strain, at about 10 Hertz; and a normal force of about 100 g for the strain sweeps; between about −100 and about 80 degree Celsius, at about 2% strain, at about 10 Hertz and a normal force of about 200 g for the temperature sweep.

| Name | Compound | PHR | Gram |
|---|---|---|---|
| SMR-L | Rubber | 100 | 150 |
| 1165MP | Silica | 50 | 75 |

-continued

| Name | Compound | PHR | Gram |
|---|---|---|---|
| N110 | Carbon | 3.0 | 4.5 |
| Sundex | Process Oil | 5.0 | 7.5 |
| ZnO | Zinc Oxide | 4.0 | 6 |
| Industrene R | Stearic Acid | 2.0 | 3 |
| Naugard Q | AntiOx | 2.0 | 3 |
| Flexzone 7P | AntiOz | 2.5 | 3.75 |
| Sunproof Wax | Wax | 1.0 | 1.5 |
| A-1289 S4-Silane | Silane | 4.4 | 6.6 |
| Rubbermakers | Sulfur | 1.4 | 2.1 |
| Santocure | TBBS | 1.6 | 2.4 |
| DPG | DPG | 2.0 | 3.0 |

| $G'_{initial}$ (dyn/cm$^2$) {.11% strain} | $\Delta G'$ (dyn/cm$^2$) {.11-10% strain} | $G''_{max}$ (dyn/cm$^2$) | $\tan\delta_{max}$ | $\tan\delta$ −40° C./wear | $\tan\delta$ 0° C./wet traction in PS | G' 0° C. (dyn/cm2) | G' 60° C. (dyn/cm2) | $\tan\delta$ 60° C./good for RR |
|---|---|---|---|---|---|---|---|---|
| 4.34E+07 | 2.40E+07 | 5.37E+06 | 0.1938 | 0.7031 | 0.1258 | 7.25E+07 | 3.58E+07 | 0.1092 |

Example 1 above demonstrates the utility of a typical rubber formulation comprising a imidoalkoxysilane coupling agent and a precipitated silica reinforcing filler as compared to the conventional commercial silane coupling agent shown in comparative example 2, primarily in the reduction of storage modulus in the isothermal strain sweep, and in reduction of tan delta in the rolling resistance regime of the temperature sweep.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A rubber comprising:
   (a) α,β-unsaturated cyclic imidoalkoxysilane of the general formula:

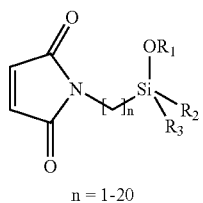

n = 1-20 wherein $R^1$ is an alkylene or cycloalkylene group of from 1 to about 20 carbon atoms or an arylene group of from 6 to about 20 carbon atoms, $R^2$ and $R^3$ each is independently is an alkoxy, an alkyl or cycloalkyl group of from 1 to about 20 carbon atoms or an aryl group of from 6 to about 20 carbon atoms, and n is an integer from about 1 to about 20;
   (b) at least one particulate filler; and
   (c) at least one rubber selected from the group consisting of (i) solution polymerization-derived styrene-butadiene rubber (S-SBR) having from about 10 to about 80 percent vinyl content; (ii) emulsion polymerization-derived rubber; and (iii) butadiene rubber having from about 5 to about 99 percent cis content and from about 0 to about 50 percent vinyl content; (iv) synthetic isoprene rubber; (v) natural rubber; and (vi) any mixtures thereof.

2. The rubber of claim 1 wherein the α,β-unsaturated cyclic imidoalkoxysilanes is N-(propyl triethoxysilane) maleimide.

3. The rubber of claim 1 wherein the filler is selected from the group consisting of oxides, such as silica (pyrogenic, fumed and precipitated), titanium dioxide, aluminosilicate, alumina, siliceous materials, clays, talc, and carbon black.

4. The rubber of claim 3 wherein the filler is pretreated with at least one α,β-unsaturated cyclic imidoalkoxysilanes before being added to the rubber.

5. The rubber of claim 4 wherein the α,β-unsaturated cyclic imidoalkoxysilane used to pretreat the filler has the general formula:

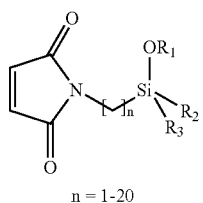

n = 1-20 wherein $R^1$ is an alkylene or cycloalkylene group of from 1 to about 20 carbon atoms or an arylene group of from 6 to about 20 carbon atoms, $R^2$ and $R^3$ each is independently is an alkoxy, an alkyl or cycloalkyl group of from 1 to about 20 carbon atoms or an aryl group of from 6 to about 20 carbon atoms, and n is an integer from about 1 to about 20.

6. The rubber of claim 5 wherein the α,β-unsaturated cyclic imidoalkoxysilanes used to pretreat the filler is N-(propyl triethoxysilane) maleimide.

7. The solution polymerization-derived styrene-butadiene rubber (S-SBR) of claim 1 having from about 25 to about 75 percent vinyl content.

8. The solution polymerization-derived styrene-butadiene rubber (S-SBR) of claim 1 having a bound styrene content of up to about 50 percent.

9. The solution polymerization-derived styrene-butadiene rubber (S-SBR) of claim 8 having a bound styrene content of from about 5 to about 36 percent.

10. The butadiene rubber (SBR) of claim 1 having from about 5 percent to about 99 percent cis content and from about 0 percent to about 60 percent vinyl content.

11. The emulsion polymerization-derived rubber of claim 1 wherein the emulsion polymerization-derived rubber is selected from the group consisting of styrene/butadiene rubber, butadiene/acrylonitrile rubber and styrene/butadiene/acrylonitrile rubber.

12. The emulsion polymerization-derived rubber of claim 11 wherein the emulsion polymerization-derived rubber contains from about 30 to about 45 weight percent bound styrene.

13. The emulsion polymerization-derived rubber of claim 11 wherein the emulsion polymerization-derived rubber contains from about 20 to about 28 weight percent of bound styrene.

14. The emulsion polymerization-derived rubber of claim 11 wherein the emulsion polymerization prepared styrene/butadiene/acrylonitrile terpolymer rubber contains from about 2 to about 40 weight percent acrylonitrile.

15. The rubber composition of claim 1 further comprising a curative and, optionally, at least one other additive selected from the group consisting of sulfur compounds, activators, retarders, accelerators, processing additives, oils, plasticizers, tackifying resins, silicas, fillers, pigments, fatty acids, zinc oxide, waxes, antioxidants and antiozonants, peptizing agents, reinforcing materials, and mixtures thereof.

16. The rubber composition of claim 2 further comprising at least one curative and, optionally, at least one other additive selected from the group consisting of sulfur compounds, activators, retarders, accelerators, processing additives, oils, plasticizers, tackifying resins, silicas, fillers, pigments, fatty acids, zinc oxide, waxes, antioxidants and antiozonants, peptizing agents, reinforcing materials, and mixtures thereof.

17. The rubber composition of claim 5 further comprising at least one curative and, optionally, at least one other additive selected from the group consisting of sulfur compounds, activators, retarders, accelerators, processing additives, oils, plasticizers, tackifying resins, silicas, fillers, pigments, fatty acids, zinc oxide, waxes, antioxidants and antiozonants, peptizing agents, reinforcing materials, and mixtures thereof.

18. The rubber composition of claim 6 further comprising at least one curative and, optionally, at least one other additive selected from the group consisting of sulfur compounds, activators, retarders, accelerators, processing additives, oils, plasticizers, tackifying resins, silicas, fillers, pigments, fatty acids, zinc oxide, waxes, antioxidants and antiozonants, peptizing agents, reinforcing materials, and mixtures thereof.

* * * * *